United States Patent
Shahana

(10) Patent No.: US 9,944,345 B2
(45) Date of Patent: Apr. 17, 2018

(54) BICYCLE CONTROL DEVICE

(75) Inventor: Satoshi Shahana, Osaka (JP)

(73) Assignee: Shimano Inc., Osaka (JP)

( * ) Notice: Subject to any disclaimer, the term of this patent is extended or adjusted under 35 U.S.C. 154(b) by 1874 days.

(21) Appl. No.: 12/236,579

(22) Filed: Sep. 24, 2008

(65) Prior Publication Data

US 2009/0158881 A1    Jun. 25, 2009

(30) Foreign Application Priority Data

Dec. 20, 2007   (JP) ................................. 2007-329131

(51) Int. Cl.
  *B62K 23/06*   (2006.01)
  *B62M 25/04*   (2006.01)

(52) U.S. Cl.
  CPC ............ *B62K 23/06* (2013.01); *B62M 25/04* (2013.01); *Y10T 74/20426* (2015.01)

(58) Field of Classification Search
  USPC ............ 74/502.2, 488, 489, 473.14, 473.15, 74/501.5 R, 500.5, 528, 529, 532–534, 74/535, 536; 280/276, 271; 188/319.2, 188/299.1, 300
  See application file for complete search history.

(56) References Cited

U.S. PATENT DOCUMENTS

| | | | |
|---|---|---|---|
| 2,534,566 A * | 12/1950 | Yapp ............................ | 74/502.2 |
| 2,770,980 A * | 11/1956 | Millward ....................... | 74/489 |
| 3,800,618 A | 4/1974 | Yoshigai | |
| 4,055,093 A * | 10/1977 | Ross ............................. | 74/501.6 |
| 4,267,742 A * | 5/1981 | Cabeza ........................ | 74/502.2 |
| 5,241,878 A | 9/1993 | Nagano | |
| 5,279,180 A * | 1/1994 | Henriksson .................. | 74/502.2 |
| 5,896,779 A * | 4/1999 | Biersteker et al. .......... | 74/502.2 |

(Continued)

FOREIGN PATENT DOCUMENTS

| | | |
|---|---|---|
| EP | 0 790 176 A1 | 8/1997 |
| EP | 1 375 325 A2 | 1/2004 |

(Continued)

OTHER PUBLICATIONS

Office Action of corresponding EP Application No. 08 166 795.8 dated Apr. 8, 2011.

*Primary Examiner* — Daniel D Yabut
(74) *Attorney, Agent, or Firm* — Global IP Counselors, LLP

(57) ABSTRACT

A bicycle control device is basically provided with a mounting part, a first actuating unit, a second actuating unit and a first operating member. The first actuating unit includes a first actuating member that is connected to a first component part and a first positioning mechanism that selectively maintains a position of the first actuating member with respect to the mounting member. The second actuating unit includes a second actuating member that is connected to a second component part and a second positioning mechanism that selectively maintains a position of the second actuating member with respect to the mounting member. The first operating member is operatively coupled to the first and second actuating units to operate the first actuating unit when the first operating member is moved in a first direction and to operate the second actuating unit when the first operating member is moved in a second direction.

8 Claims, 11 Drawing Sheets

(56) References Cited

U.S. PATENT DOCUMENTS

| | | | |
|---|---|---|---|
| 5,927,441 A * | 7/1999 | Luo | 74/502.2 |
| 6,032,765 A * | 3/2000 | Hsi-Chia | 74/502.2 |
| 2004/0244526 A1 | 12/2004 | Jones | |
| 2006/0272443 A1* | 12/2006 | Tsumiyama | 74/502.2 |
| 2007/0068316 A1 | 3/2007 | Kawakami et al. | |
| 2007/0096426 A1 | 5/2007 | McAndrews | |

FOREIGN PATENT DOCUMENTS

| | | |
|---|---|---|
| JP | 2-225191 A | 9/1990 |
| JP | H10-053183 A | 2/1998 |
| JP | 2005-153864 A | 6/2005 |
| JP | 2007-145296 A | 6/2007 |
| JP | 2007-230553 A | 9/2007 |
| JP | 2008-195385 A | 2/2008 |
| TW | 200720147 | 6/2007 |

* cited by examiner

BICYCLE CONTROL DEVICE

CROSS-REFERENCE TO RELATED APPLICATIONS

This application claims priority under 35 U.S.C. § 119 to Japanese Patent Application No. 2007-329131, filed Dec. 20, 2007. The entire disclosure of Japanese Patent Application No. 2007-329131 is hereby incorporated herein by reference.

BACKGROUND OF THE INVENTION

Field of the Invention

This invention generally relates to a bicycle control device. More specifically, the present invention relates to a bicycle control device for a bicycle that is configured to operate both two different component parts of the bicycle.

Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

A bicycle is typically equipped with several component parts that need to be manually operated by the rider. Such component parts include gear changing devices and brake devices (examples of the "first component part") as well as suspension devices (example of the "second component part"). Conventionally, separate bicycle control devices have been used to operate each of these component parts. Among such operating or control devices, there are known bicycle operating or control devices that individually operate a brake device or gear changing device and a suspension device (e.g., see Japanese Laid-Open Patent Publication No. 10-53183). When an operating or control device that operates a brake device can also be used to operate a suspension device, the suspension device can be adjusted more easily while the bicycle is being ridden.

In the bicycle control device disclosed in Japanese Laid-Open Patent Publication No. 10-53183, both a brake lever for operating the brakes and a suspension operating member for adjusting the suspension device are attached to a base member (bracket) of the brake bicycle control device. The suspension operating member is a lever member that is pivotally attached to the base member in a position that is different from the position where the brake lever is attached. With the bicycle control device disclosed in Japanese Laid-Open Patent Publication No. 10-53183, a rider of the bicycle must release his or her hand from the brake lever in order to perform an operation to adjust the suspension. Consequently, the suspension cannot be adjusted when the rider is applying the brakes (i.e., operating the brake lever) while, for example, riding downhill or traveling at a high speed.

In view of the above, it will be apparent to those skilled in the art from this disclosure that there exists a need for an improved bicycle control device. This invention addresses this need in the art as well as other needs, which will become apparent to those skilled in the art from this disclosure.

SUMMARY OF THE INVENTION

One object of the present invention is to enable a rider to operate two different component parts of a bicycle without releasing his or her hand from the operating member.

In accordance with a first aspect, a bicycle control device is provided for operating a first component part and a second component part of a bicycle. The bicycle control device basically includes a mounting part, a first actuating unit, a second actuating unit and a first operating member. The mounting part is configured to be mounted to the bicycle. The first actuating unit includes a first actuating member configured to be connected to the first component part and a first positioning mechanism operatively coupled to the first actuating member to selectively maintain a position of the first actuating member with respect to the mounting member. The second actuating unit includes a second actuating member configured to be connected to the second component part and a second positioning mechanism operatively coupled to the second actuating member to selectively maintain a position of the second actuating member with respect to the mounting member. The first operating member is movably coupled to the mounting part and operatively coupled to the first and second actuating units to operate the first actuating unit when the first operating member is moved in a first direction and to operate the second actuating unit when the first operating member is moved in a second direction that is different from the first direction.

With this bicycle control device, when the first operating member is moved in the first direction, the movement causes the first actuating unit to operate such that the first actuating member (which is connected to the first component part) is positioned by the first positioning mechanism. Similarly, when the first operating member is moved in the second direction, the movement causes the second actuating unit to operate such that the second actuating member (which is connected to the second component part) is positioned by the second positioning mechanism. For example, if the first component part is a gear changing device and the second component part is a suspension device, then the gear changing device can be made to execute a gear change operation by moving the first operating member in the first direction and the suspension device can be adjusted by moving the first operating member in the second direction. Since the positions of two different parts can be adjusted by changing the direction in which the first operating member is moved, both the first component part and the second component part can be operated easily with a single first operating member. As a result, two component parts that require positioning, e.g., a gear changing device and a suspension device, can be operated by operating a single first operating member in different directions and the two component parts can be operated easily without releasing one's hand from the first operating member.

In accordance with a second aspect, the bicycle control device of the first aspect is provided such that the first and second directions are opposite rotational directions. In this aspect, the first operating member can easily be operated in two directions with a finger because the first and second directions are opposite directions.

In accordance with a third aspect, the bicycle control device of the first aspect is further provided with a second operating member movably coupled to the mounting part such that movement of the second operating member with respect to the mounting part results in the first actuating member moving to a first actuation position from a second actuation position as determined by the first positioning mechanism in which the second actuation position that is different from the first actuation position. With this aspect, since two operating members can be used to move the first actuating member in different directions, a gear changing device can be operated so as to upshift and downshift.

In accordance with a fourth aspect, the bicycle control device of the first aspect is provided such that the mounting part includes a housing having the first and second actuating units disposed within the housing. With this aspect, the bicycle control device is more compact because the two actuating units are installed inside a single housing. Furthermore, the structure and assembly of the bicycle control device can be simplified and the weight of the bicycle control device reduced by configuring the bicycle control device such that the two actuating units pivot about a common axis.

In accordance with a fifth aspect, the bicycle control device of the first aspect is provided such that the first operating member is arranged between the first actuating unit and the second actuating unit. With this aspect, the movement of the first operating member can be transmitted with a simple structure.

In accordance with a sixth aspect, the bicycle control device of the first aspect is further provided with a first movement transmitting mechanism arranged between the first operating member and the first actuating unit to transmit a movement of the first operating member in the first direction to the first actuating unit; and a second movement transmitting mechanism arranged between the first operating member and the second actuating unit to transmit a movement of the first operating member in the second direction that is different from the first direction to the second actuating unit. With this aspect, since the first and second actuating units are arranged on two opposite sides of the first operating member, movement of the first operating member in the first and second directions can be transmitted to the first and second actuating units more easily.

In accordance with a seventh aspect, the bicycle control device of the sixth aspect is provided such that the first movement transmitting mechanism has a first movement transmitting member movably mounted with respect to the mounting part, and a first protruding part provided on a portion of the first operating member, the first movement transmitting member being engaged with the first protruding part in response to movement of the first operating member in the first direction to operate the first actuating unit; and the second movement transmitting mechanism has a second movement transmitting member movably mounted with respect to the mounting part, and a second protruding part provided on a portion of the first operating member, the second movement transmitting member being engaged with the second protruding part in response to movement of the first operating member in the second direction to operate the second actuating unit. With this aspect, the movement of the first operating member is transmitted by the engagement of the first and second protruding parts provided on two opposite sides of the first operating member with the first and second engaging parts. As a result, the movement of the first operating member can be transmitted with a simple structure.

In accordance with an eighth aspect, the bicycle control device of the third aspect is provided such that the second actuating unit is configured to move alternately between a third actuation position and a fourth actuation position in response to movement of the first operating member in the second direction. With this aspect of the invention, the second actuating unit can be moved alternately between a third position and a fourth position by simply moving the first operating member in the second direction. As a result, a second component part can be switched between two different states, e.g., on and off, by operating the first operating member in the second direction.

In accordance with a ninth aspect, a bicycle control device is provided for operating a first component part and a second component part of a bicycle. The bicycle control device basically includes a mounting part, a first actuating unit, a second actuating unit, and a first operating member, a first movement transmitting mechanism and a second movement transmitting mechanism. The mounting part is configured to be mounted to the bicycle. The first actuating unit is disposed on the mounting part and includes a first component connecting member that is configured to be connected to the first component part. The second actuating unit is disposed on the mounting part and includes a second component connecting member that is configured to be connected to the second component part. The first operating member is movably coupled to the mounting part and operatively coupled to the first and second actuating units in response to movement of the first operating member with respect to the mounting part. The first movement transmitting mechanism is arranged between the first operating member and the first actuating unit to transmit a movement of the first operating member in a first direction to the first actuating unit. The second movement transmitting mechanism is arranged between the first operating member and the second actuating unit to transmit a movement of the first operating member in a second direction that is different from the first direction to the second actuating unit.

With this bicycle control device, when the first operating member is moved in the first direction, the movement is transmitted to the first actuating unit by the first movement transmitting mechanism. As a result, the first actuating unit operates and the first component part connected to the first actuating unit can be actuated. Similarly, when the first operating member is moved in the second direction, the movement is transmitted to the second actuating unit by the second movement transmitting mechanism. As a result, the second actuating unit operates and the second component part connected to the second actuating unit can be actuated. Since the first and second movement transmitting mechanisms are arranged between the first operating member and the first and second actuating units, two component parts can be actuated by moving the first operating member in different directions. Consequently, two component parts can be operated easily without releasing one's hand from the first operating member.

In accordance with a tenth aspect, the bicycle control device of the ninth aspect is provided such that the first actuating unit includes a first actuating member configured to be connect to the first component part and a first positioning mechanism operatively coupled to the first actuating member; and the second actuating unit has a second actuating member configured to be connect to the second component part and a second positioning mechanism operatively coupled to the second actuating member. With this aspect, when the first operating member is operated in the first direction, the movement of the first operating member is transmitted from the first movement transmitting mechanism to the first actuating unit and the first actuating member (which is configured to connect to the first component part) is positioned by the first positioning mechanism. Furthermore, when the first operating member is operated in the second direction, the movement of the first operating member is transmitted from the second movement transmitting mechanism to the second actuating unit and the second actuating member (which is configured to connect to the second component part) is positioned by the second positioning mechanism. As a result, two component parts that require positioning, e.g., a gear changing device and a suspension device, can be operated by operating a single first operating member in different directions and the two component parts can be operated easily without releasing one's hand from the first operating member.

In accordance with an eleventh aspect, the bicycle control device of the tenth aspect is provided such that the first and second directions are opposite rotational directions. In this aspect, the first operating member can easily be operated in two directions with a finger because the first and second directions are opposite directions.

In accordance with a twelfth aspect, the bicycle control device of the tenth aspect is further provided with a second operating member movably coupled to the mounting part such that movement of the second operating member with respect to the mounting part results in the first actuating member moving to a first actuation position from a second actuation position as determined by the first positioning mechanism in which the second actuation position that is different from the first actuation position. With this aspect, since two operating members can be used to move the first actuating member in different directions, a gear changing device can be operated so as to upshift and downshift.

In accordance with a thirteenth aspect, the bicycle control device of the ninth aspect is provided such that the mounting part includes a housing having the first and second actuating units disposed within the housing. With this aspect, the bicycle control device is more compact because the two actuating units are installed inside a single housing. Furthermore, the structure and assembly of the bicycle control device can be simplified and the weight of the bicycle control device reduced by configuring the bicycle control device such that the two actuating units pivot about a common axis.

In accordance with a fourteenth aspect, the bicycle control device of the ninth aspect is provided such that the first operating member is arranged between the first actuating unit and the second actuating unit. With this aspect, the movement of the first operating member can be transmitted with a simple structure.

In accordance with a fifteenth aspect, the bicycle control device of the ninth aspect is provided such that the first movement transmitting mechanism has a first movement transmitting member movably mounted with respect to the mounting part, and a first protruding part provided on a portion of the first operating member, the first movement transmitting member being engaged with the first protruding part in response to movement of the first operating member in the first direction to operate the first actuating unit; and the second movement transmitting mechanism has a second movement transmitting member movably mounted with respect to the mounting part, and a second protruding part provided on a portion of the first operating member, the second movement transmitting member being engaged with the second protruding part in response to movement of the first operating member in the second direction to operate the second actuating unit. With this arrangement, since the first and second movement transmitting mechanisms are arranged between the first operating member and the first and second actuating units, two component parts can be actuated by moving the first operating member in different directions. Consequently, two component parts can be operated easily without releasing one's hand from the first operating member.

In accordance with a sixteenth aspect, the bicycle control device of the fourteenth aspect is provided such that the second actuating unit is configured to move alternately between a third actuation position and a fourth actuation position in response to a movement of the first operating member in the second direction. With this aspect, the second actuating unit can be moved alternately between a third position and a fourth position by simply moving the first operating member in the second direction. As a result, a second component part can be switched between two different states, e.g., on and off, by operating the first operating member in the second direction.

In accordance with a seventeenth aspect, a bicycle operating system is provided that basically includes a gear changing device, a suspension device and a bicycle control device. The gear changing device is configured to be mounted to a bicycle. The suspension device is configured to be mounted to the bicycle. The bicycle control device is operatively coupled to the gear changing device and the suspension device. The bicycle control device basically includes a mounting part, a first actuating unit, a second actuating unit and a first operating member. The mounting part is configured to be mounted to the bicycle. The first actuating unit is disposed on the mounting part and operatively coupled to the gear changing device to change gear positions. The second actuating unit is disposed on the mounting part and operatively coupled to the suspension device to change suspension states. The first operating member is movably coupled to the mounting part and operatively coupled to the first and second actuating units to operate the first actuating unit when the first operating member is moved in a first direction and to operate the second actuating unit when the first operating member is moved in a second direction that is different from the first direction. With this bicycle control device, when the first operating member is moved in the first direction, the movement causes the first actuating unit to operate such that the gear changing device can be shifted. With this bicycle control device, when the first operating member is moved in the second direction, the movement causes the second actuating unit to operate such that the suspension device can be adjusted. Since both the gear changing device and the suspension device can be operated by changing the direction in which the first operating member is moved, two devices can be easily operated with a single first operating member. As a result, a gear changing device and a suspension device can be operated by operating a single first operating member in different directions and the two devices can be operated easily without releasing one's hand from the first operating member.

In accordance with an eighteenth aspect, the bicycle operating system of the seventeenth aspect is provided such that the first and second directions are opposite rotational directions. In this aspect, the first operating member can easily be operated in two directions with a finger because the first direction and the second direction are opposite directions In accordance with a nineteenth aspect, the bicycle operating system of the seventeenth aspect is provided such that the first actuating unit includes a first actuating member configured to be connect to the gear changing device and a first positioning mechanism operatively coupled to the first actuating member, with the first positioning mechanism holding the first actuating member in one of a plurality of actuation positions and the first actuating member being moved in response to the first operating member being moved in the first direction to shift the gear changing device; and the second actuating unit has a second actuating member configured to be connect to the suspension device and a second positioning mechanism operatively coupled to the second actuating member, with the second positioning mechanism holding the second actuating member in one of a plurality of operating positions and the second actuating member being moved in response to the first operating member being moved in the second direction to change an operating state of the suspension device.

In a different aspect, since the positions of two different parts can be adjusted by changing the direction in which the first operating member is moved, both the first component part and the second component part can be operated easily with a single first operating member. As a result, two component parts that require positioning, e.g., a gear changing device and a suspension device, can be operated by operating a single first operating member in different directions and the two component parts can be operated easily without releasing one's hand from the first operating member.

In still another aspect of the present invention, since both the gear changing device and the suspension device can be operated by changing the direction in which the first operating member is moved, two devices can be easily operated with a single first operating member. As a result, a gear changing device and a suspension device can be operated by operating a single first operating member in different directions and the two devices can be operated easily without releasing one's hand from the first operating member.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
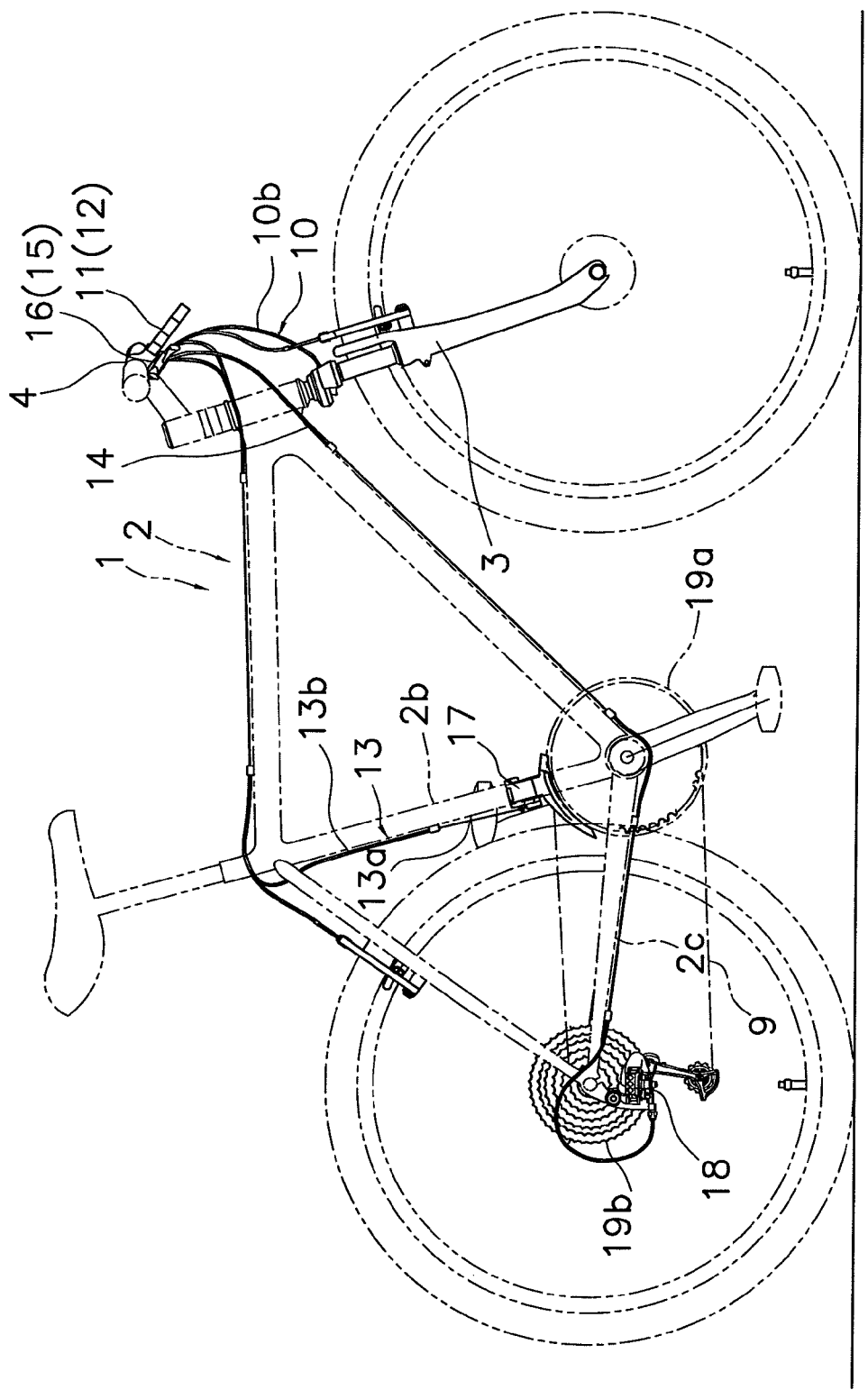
FIG. 1 is a side elevational view of a bicycle equipped with a bicycle control device in accordance with a first embodiment.

Referring initially to FIG. 1, a bicycle 1 is illustrated in accordance with a first embodiment. The bicycle 1 basically includes a frame 2 having a suspension fork 3 and a handlebar 4 fixed to an upper part of the suspension fork 3. A front gear shifter device 15 is mounted to the handlebar 4 for operating a front derailleur 17, which is mounted to an intermediate section of the frame 2. The front gear shifter device 15 is an example of a bicycle control device for the bicycle 1 that operates the front derailleur 17 and the suspension fork 3. Thus, the front derailleur 17 is an example of a gear changing device that constitutes a first component part. The suspension fork 3 is an example of a suspension device that constitutes a second component part. The suspension fork 3 can be switched between a locked (off) state in which the suspension does not operate and an operational (on) state in which the suspension does operate. The suspension fork 3 is connected to the front gear shifter device 15 by with a state switching cable 10.

Also a rear derailleur 18 is mounted to a rear end section of the frame 2. The front derailleur 17 is arranged, for example, on a bottom portion of a seat tube 2b of the frame 2. The front derailleur 17 is configured to guide a chain 9 onto any one of the sprockets of a front sprocket cluster 19a having, for example, three sprockets. The rear derailleur 18 is arranged, for example, on a rear end portion of a chain stay 2c of the frame 2. The rear derailleur 18 is configured to guide the chain 9 onto any one of the sprockets of a rear sprocket cluster 19b having, for example, nine sprockets. The front derailleur 17 is connected to the front derailleur operating unit 15 with a front shift cable 13 and the rear derailleur 18 is connected to a rear gear shifter device 16 with a rear shift cable 14. Therefore, the front derailleur 17 has three shift positions and the rear derailleur 18 has nine shift positions. The number of shift positions in the front can be two or three and the number of shift positions in the rear is not limited to nine.

The front gear shifter device 15 is arranged on the handlebar 4 closely adjacent to a brake lever 12 on the inward side of the brake lever 12, and the rear gear shifter device 16 is arranged on the handlebar 4 closely adjacent to a brake lever 11 on the inward side of the brake lever 11.

Figure 2:
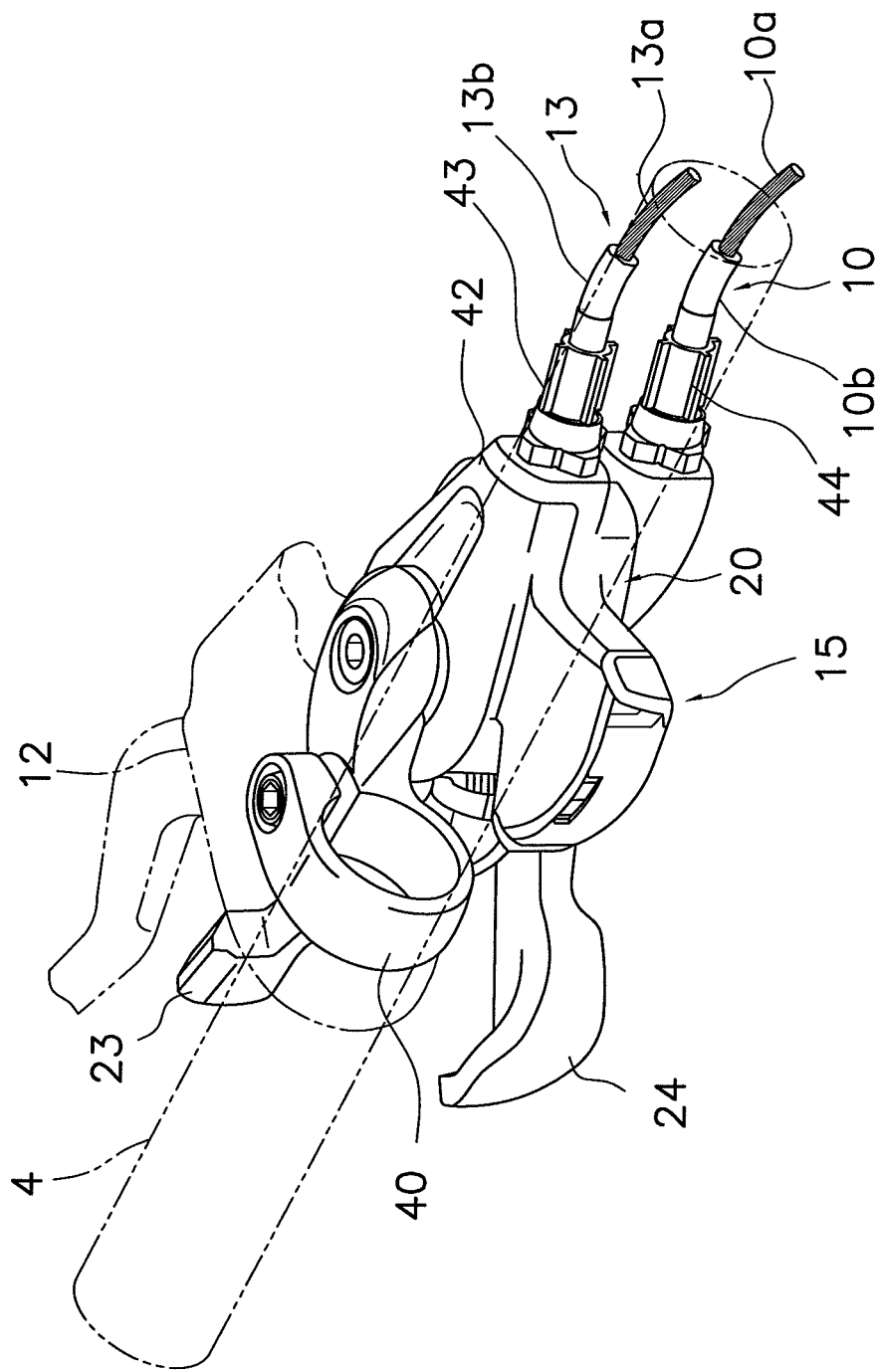
FIG. 2 is a perspective view of the bicycle control device in accordance with the first embodiment.

The front gear shifter device 15 is configured such that it can shift the front derailleur 17 among three shift positions and such that it can switch the operating state of the suspension fork 3 between an on-state and an off-state. As shown in FIG. 2, the front gear shifter device 15 has a mounting part 20 configured to be mounted to the handlebar 4 on the inward side of the rear brake lever 12. FIG. 2 is a perspective view from a position diagonally above the front gear shifter device 15. It is also acceptable for the mounting part 20 to be fixed integrally to a bracket of the rear brake lever 12.

Figure 3:
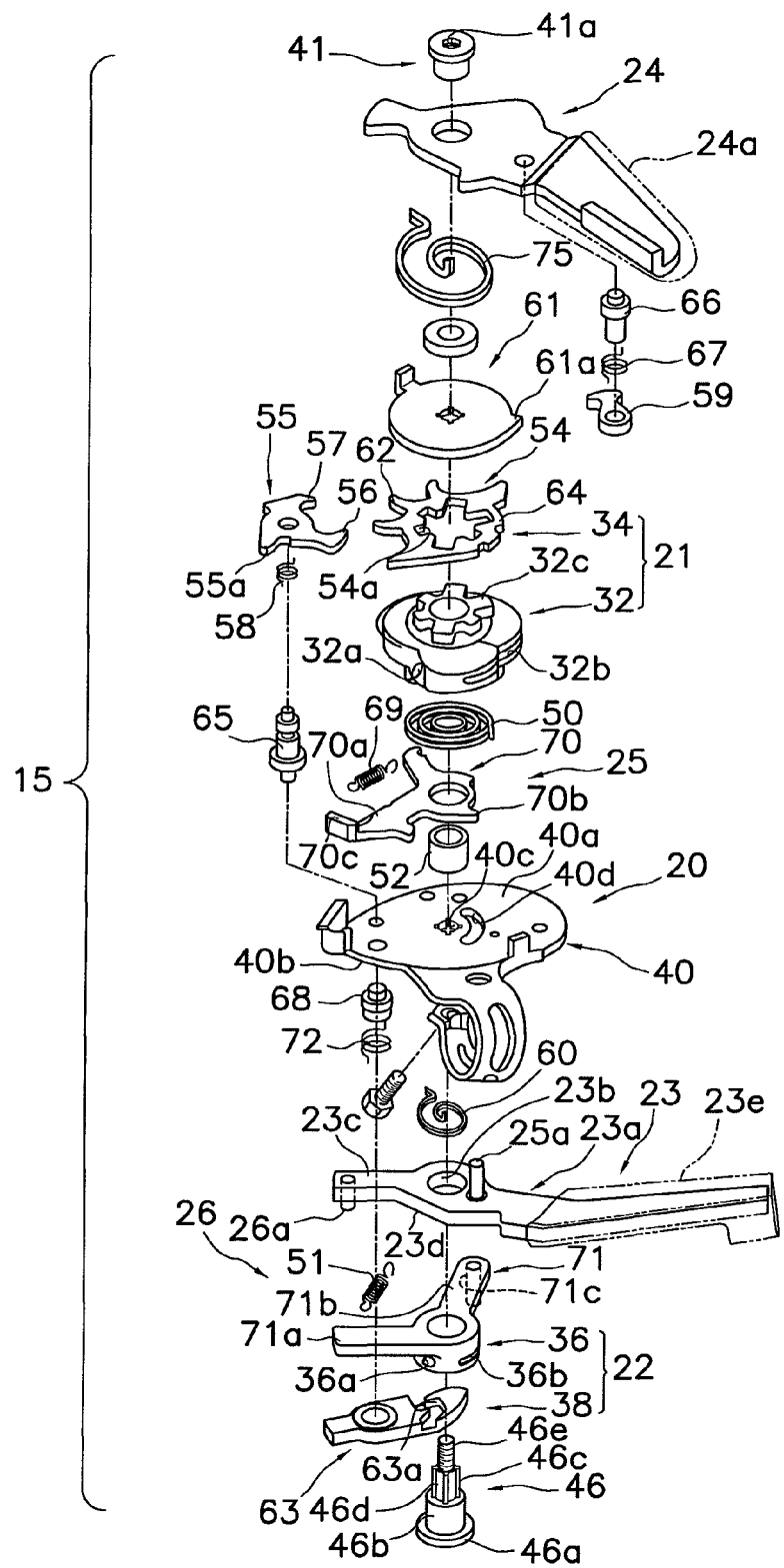
FIG. 3 is a simplified, exploded perspective view of the bicycle control device in accordance with the first embodiment.

As shown in FIG. 3, the front gear shifter device 15 includes a first actuating unit 21, a second actuating unit 22, a first operating member 23, a second operating member 24, a first movement transmitting mechanism 25 and second movement transmitting mechanism 26. The first actuating unit 21 is provided on the mounting part 20. The front gear shifter device 15 is configured to be connected to the front derailleur 17 by the front shift cable 13. The second actuating unit 22 is provided on the mounting part 20 and configured to be connected to the suspension fork 3 by the state switching cable 10. The first operating member 23 is movably provided on the mounting part 20 and configured to operate the first and second actuating units 21 and 22. The second operating member 24 is movably provided on the mounting part 20. The first movement transmitting mechanism 25 is arranged between the first operating member 23 and the first actuating unit 21. The first movement transmitting mechanism 25 is configured to transmit a movement of the first operating member 23 to the first actuating unit 21 in a first rotational direction. The second movement transmitting mechanism 26 is arranged between the first operating member 23 and the second actuating unit 22. The second movement transmitting mechanism 26 is configured to transmit a movement of the first operating member 23 to the second actuating unit 22 in a second rotational direction that is different from the first rotational direction.

As shown in FIG. 3, the mounting part 20 has a bracket 40 and a housing 42. The bracket 40 is made of, for example, sheet metal. The mounting part 20 is configured to be fastened to the handlebar 4 by tightening a bolt. The housing 42 is attached to the bracket 40 and configured to house the first and second actuating units 21 and 22. FIG. 3 is a bottom plan view from underneath the front gear shifter device 15 with the housing 42 omitted.

The bracket 40 has a first flat surface 40a, a second flat surface 40b and a non-circular opening 40c. The second flat surface 40b is located on a back side of the first flat surface 40a. The non-circular opening 40c receives a pivot shaft 46 in a non-rotatable fashion. The pivot shaft 46 is arranged to pass through the opening 40c of the bracket 40 and extend upward. The pivot shaft 46 is fastened with a fastening nut 41 installed on a tip (distal) end of the pivot shaft 46. The pivot shaft 46 serves to secure the second operating member 24 and other components (described later). The fastening nut 41 is a flanged cylindrical nut member having a hexagonal hole 41a. As shown in FIG. 2, a first outer casing stop 43 is provided for holding the outer casing 13b of the front shift cable 13 and a second outer casing stop 44 is provided for holding the outer casing 10b of the state switching cable 10. The first and second outer casing stops 43 and 44 are screwed onto the housing 42.

The pivot shaft 46 has a larger-diameter flange section 46a, first pivot support section 46b, a second pivot support section 46c, a plurality of ribs 46d and an externally threaded section 46e. The larger-diameter flange section 46a is formed on a proximal end of the pivot shaft 46 and has a larger diameter than the first pivot support section 46b. The ribs 46d are formed on the second pivot support section 46c at equal intervals in the circumferential direction. The externally threaded section 46e is formed on a distal end of the pivot shaft 46. The fastening nut 41 is configured to screw onto the externally threaded section 46e. A first cable holding member 32 (described later) and a first movement transmitting arm 70 of the first movement transmitting mechanism 25 are pivotally mounted on the second pivot support section 46c with a bushing 52 disposed in-between. The second pivot support section 46c is also non-rotatably connected to the bracket 40 by the ribs 46d. A second cable holding member 36 (described later) is pivotally mounted on the first pivot support section 46b.

The first actuating unit 21 includes the first cable holding member 32 (exemplifying a first actuating member) and a first positioning mechanism 34. The first cable holding member 32 is mounted to the mounting part 20 such that it can move in both a cable pulling direction and a cable releasing direction of an inner cable 13a of the front shift cable 13. The first positioning mechanism 34 is configured to selectively position the first cable holding member 32 in any one of a plurality of (e.g., three) actuation positions corresponding to a plurality of (e.g., three) shift positions of the front derailleur 17.

The second actuating unit 22 comprises the second cable holding member 36 (exemplifying a second actuating member) and a second positioning mechanism 38. The second cable holding member 36 is formed integrally with the second movement transmitting mechanism 26. The second cable holding member 36 is mounted to the mounting part 20 such that it can move in both a cable pulling direction and the state switching cable 10. The second positioning mechanism 38 is configured to selectively position the second cable holding member 36 in any one of a plurality of (e.g., two) actuation positions corresponding to a plurality of (e.g., two) state positions of the suspension fork 3. Although in this embodiment the second cable holding member 36 and the second movement transmitting mechanism 26 are formed as a one-piece integral unit, it is also acceptable to form the same as separate members.

The first cable holding member 32 is arranged such that it can move in a plane parallel to the first flat surface 40a of the bracket 40. More specifically, the first cable holding member 32 is mounted to the pivot shaft 46 with the bushing 52 such that it can move (pivot) freely in a cable retracting direction (cable pulling direction) and a cable release direction of the front shift cable 13. An inner cable holding section 32a is provided on an external circumferential surface of the first cable holding member 32 for engaging a cable nipple fixed to a tip end of the inner cable 13a of the front shift cable 13 (FIG. 2). A cable winding groove 32b is also provided on an external circumferential surface of the first cable holding member 32 for winding in the inner cable 13a on an external circumferential surface of the first cable holding member 32. The first cable holding member 32 is spring loaded in the cable release direction (clockwise in FIG. 3) by a spring member 50 (e.g., a torsional coil spring). One end of the spring member 50 engages with the first cable holding member 32 and the other end engages with the bracket 40. An engaging protrusion 32c is formed on an upper surface of the first cable holding member 32 for causing a positioning member 54 of the first positioning mechanism 34 to rotate together with the first cable holding member 32.

The first positioning mechanism 34 includes the positioning member 54 and a positioning pawl 55. The positioning pawl 55 has an actuating projection 55a, a stop member or tooth 56 and an over rotation preventing member or tooth 57. The positioning member 54 has, for example, three positioning teeth 62 and three winding teeth 64. The positioning member 54 is configured to move together with the first cable holding member 32. The stop tooth 56 is configured to move in a plane parallel to the first flat surface 40a between an engaging position in which it engages with the positioning teeth 62 and a release position in which it does not engage with the positioning teeth 62. The over rotation preventing member or tooth 57 is configured to move in a plane parallel to the first flat surface 40a between a contact position where it engages with the positioning teeth 62 at a different position than the stop tooth 56 and a disengaged position where it does not engage with the positioning teeth.

The first positioning mechanism 34 also has a winding pawl 59 and a holding plate 61. The winding pawl 59 is configured to move between a winding position where it engages with the winding teeth 64 and a release position where it separates from the winding teeth 64. The holding plate 61 is mounted non-rotatably to the pivot shaft 46.

The positioning member 54 has an engaging hole 54a configured to engage with the engaging protrusion 32c of the first cable holding member 32 such that the positioning member 54 moves integrally (as a unit) with the first cable holding member 32. The number of positioning teeth 62 and winding teeth 64 corresponds to the number of shift positions of the front derailleur 17. The teeth 62 and 64 are protrude radially outward from an external circumferential surface of the positioning member 54. Together with the first cable holding member 32, the positioning member 54 is spring loaded in the cable release direction (clockwise in FIG. 3) by the spring member 50. The size of the spaces between the positioning teeth 62 and the winding teeth 64 is determined based on the amount of cable movement required to achieve the shift positions of the front derailleur 17.

The stop tooth 56 and the over rotation preventing tooth 57 are formed as integral portions of the positioning pawl 55 that is attached in a freely rockable manner to a rocking shaft 65. The rocking shaft 65 is arranged to protrude from the first flat surface 40a of the bracket 40. The positioning pawl 55 is spring loaded by a spring member 58 (e.g., a torsional coil spring) in the counterclockwise direction of FIG. 3 such that the stop tooth 56 is arranged in the engaging position. The actuating projection 55a protrudes radially outward from an external circumferential surface of the positioning pawl 55. A distal end portion of the actuating projection 55a engages with a second movement transmitting protrusion 70c that has been formed by bending a distal end of the first movement transmitting arm 70 of the first movement transmitting mechanism 25.

Figure 5:
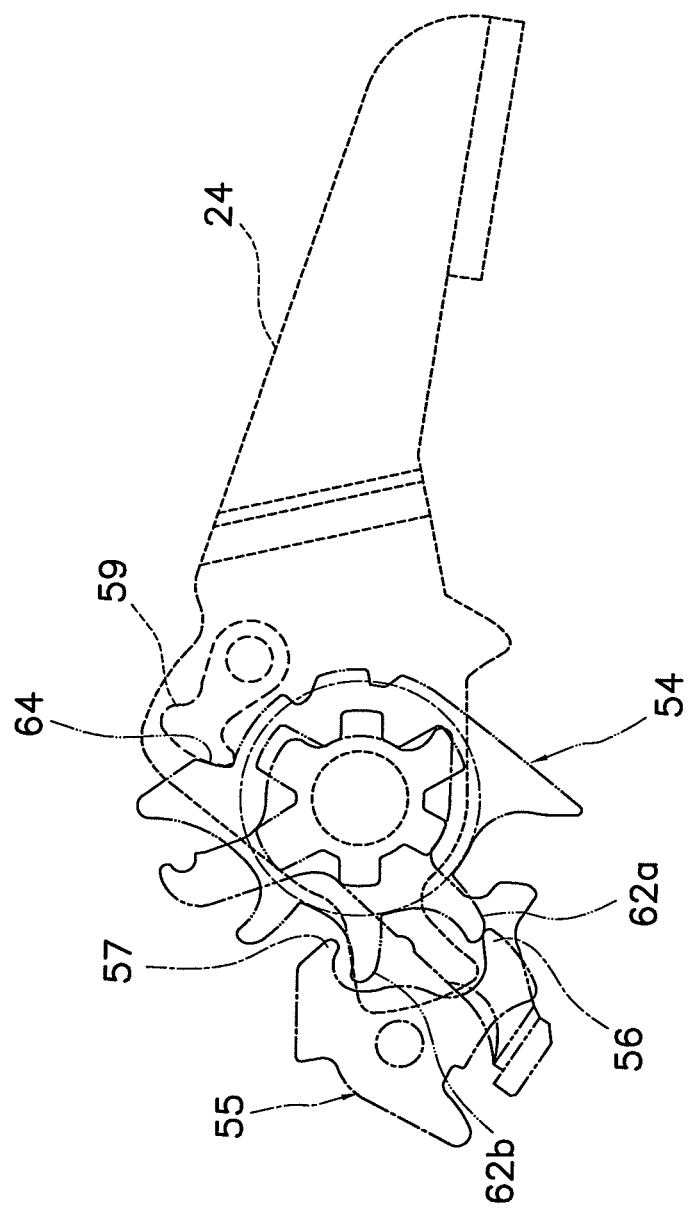
FIG. 5 is a simplified, enlarged bottom plan view, similar to FIG. 4, illustrating a second operating member in an intermediate position during an upshift operation.

The stop tooth 56 is configured to contact the positioning teeth 62 so as to stop rotation of the positioning member 54 (which is spring loaded in the clockwise direction of FIG. 3) in the cable release direction. As shown in FIG. 5, when the over rotation preventing tooth 57 moves to the contact position, it contacts a positioning tooth 62b located one tooth downstream in the release direction from the positioning tooth 62a that the stop tooth 56 was contacting, thereby preventing the positioning member 54 from continuing to rotate in the cable release direction after the positioning pawl separates from the positioning tooth 62a. When the over rotation preventing member or tooth 57 is in the contact position, the stop tooth 56 is arranged in a position located beyond the positioning tooth 62a that it was originally engaged with.

As shown in FIG. 3, the winding pawl 59 is attached in a freely rockable manner to a rocking shaft 66 arranged protruding from the second operating member 24. The winding pawl 59 is spring loaded in the counterclockwise direction of FIG. 3 by a spring member 67 (e.g., a torsional coil spring) such that the winding pawl 59 is arranged in the winding position.

The holding plate 61 is non-rotatably connected to the pivot shaft 46 by engaging with the ribs 46d of the second pivot support section 46c of the pivot shaft 46. A contact part 61a protrudes toward the winding pawl 59 is provided on the holding plate 61. When the second operating member 24 is in an operation start position (explained later), the contact part 61a serves to position the winding pawl 59 in the release position. Consequently, the winding pawl 59 is always arranged in the release position when the second operating member 24 is in the operating start position. When the second operating member 24 is operated from the operation start position toward an operation end position and the distal end of the winding pawl 59 passes the contact part 61a, the winding pawl 59 rocks toward a winding position where it contacts the winding teeth 64 due to the spring load of the spring member 67.

The second cable holding member 36 is arranged such that it can move in a plane parallel to the second flat surface 40b of the bracket 40. More specifically, the second cable holding member 36 is attached to the pivot shaft 46 such that it can move (pivot) freely in both a cable pulling direction and a cable releasing direction of the state switching cable 10. An inner cable holding section 36a is provided on an external circumferential surface of the second cable holding member 36 for engaging a cable nipple fixed to a tip end of the inner cable 10a of the state switching cable 10 (FIG. 2). A cable winding groove 36b is also provided on the external circumferential surface of the second cable holding member 36 for winding in the inner cable 10a on the external circumferential surface of the second cable holding member 36. The second cable holding member 36 is spring loaded in the cable release direction (clockwise in FIG. 3) by a spring member 51 (e.g., a coil spring). One end of the spring member 51 engages with the second movement transmitting arm 71 and the other end engages with the bracket 40.

Figure 4:
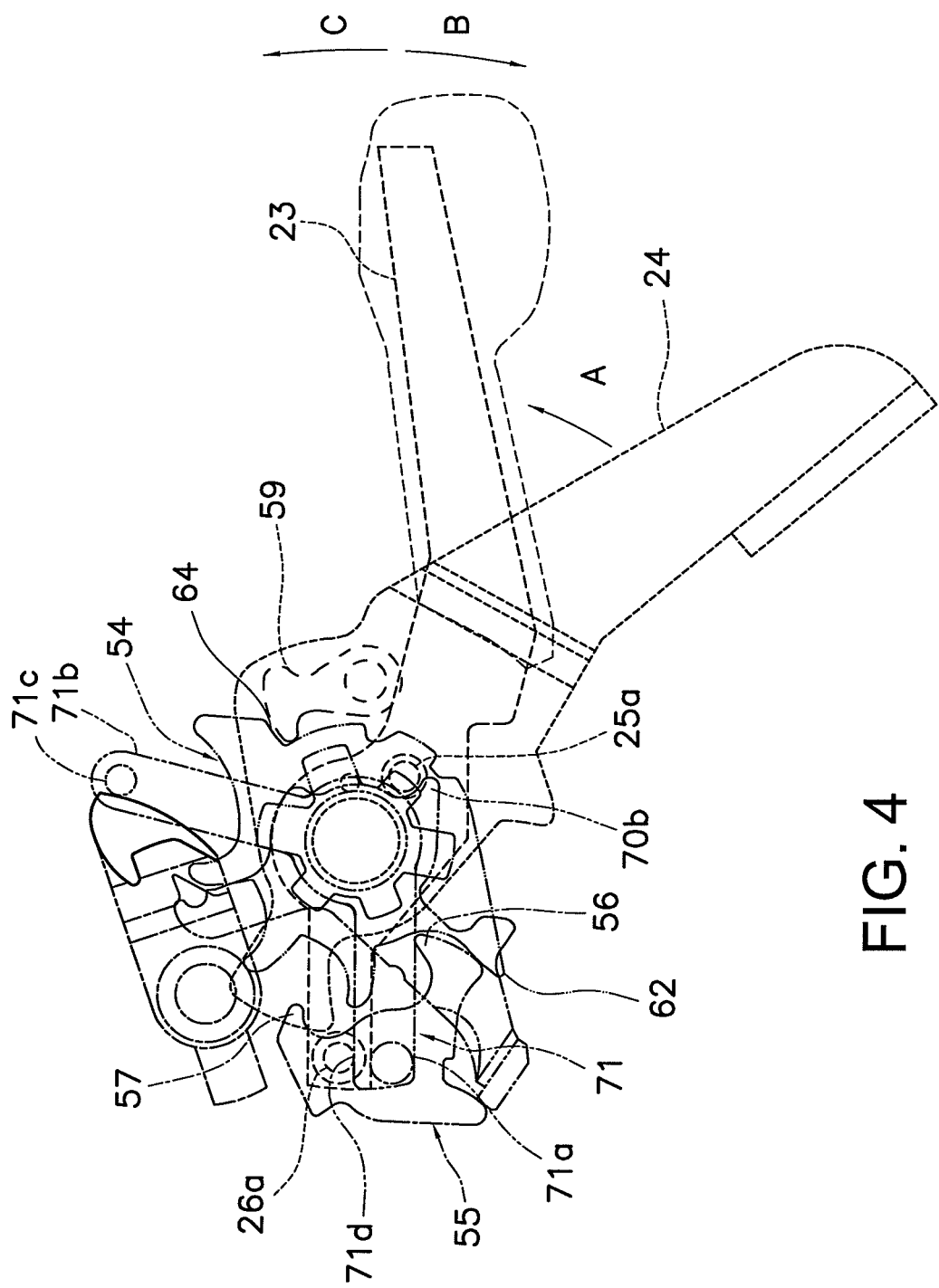
FIG. 4 is a simplified, enlarged bottom plan view of the main parts of the bicycle control device in an operation start position and a neutral position.
Figure 10:
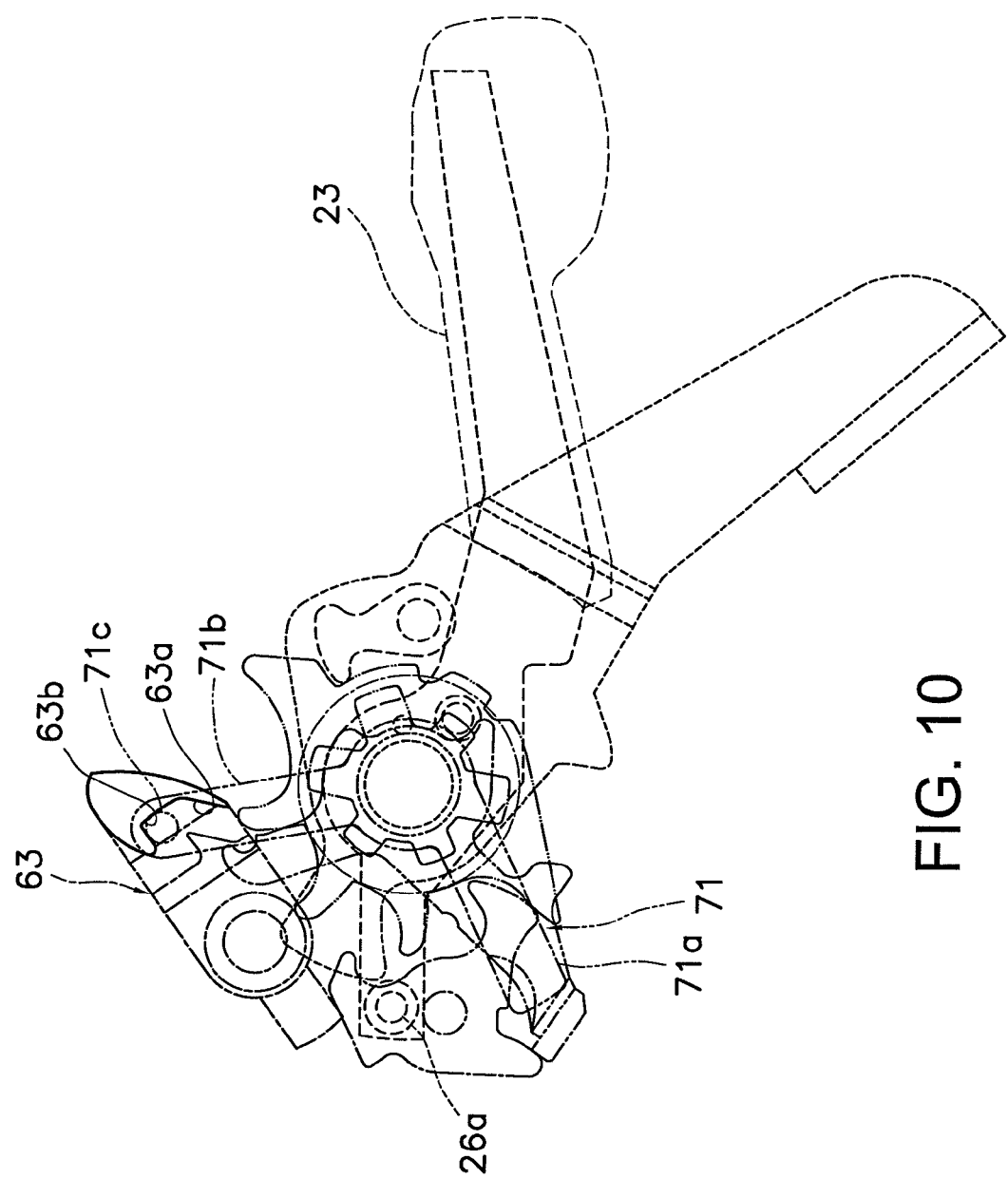
FIG. 10 is a simplified, enlarged bottom plan view, similar to FIG. 4, illustrating a situation in which the first operating member is returned to the neutral position after the locked state has obtained by performing a suspension operating state switching operation.

The second positioning mechanism 38 is configured such that the second cable holding member 36 moves alternately between two positions, i.e., a release position (exemplifying a third actuation position as illustrated in FIG. 4) and a pulling position (exemplifying a fourth actuation position as illustrated in FIG. 10), in response to a rocking movement of the first operating member 23 in the counterclockwise direction. The second positioning mechanism 38 has a lock member 63 that is attached to a rocking shaft 68 in a freely rockable manner. The rocking shaft 68 is provided in an upright fashion on the second flat surface 40b of the bracket 40. The lock member 63 is spring loaded in the clockwise direction of FIG. 3 by a spring member 72 (e.g., a torsional coil spring). The lock member 63 is configured to be moved alternately between a first holding position shown in FIG. 4 and a second holding position shown in FIG. 10 by the second movement transmitting mechanism 26. The second holding position is located counterclockwise from the first holding position when viewed as shown in FIG. 4. The rocking movement of the lock member 63 is restricted by a stopper (not shown) such that the lock member 63 will not turn beyond the first holding position in the clockwise direction. A curved cam groove 63a configured to engage with the second movement transmitting mechanism 26 is formed in a portion of the lock member 63 located between a distal end of the lock member 63 and the rocking axis of the same (i.e., toward the rightward end in FIG. 3). An engaging pin 71c of the second movement transmitting arm 71 (described later) engages with the cam groove 63a.

The first operating member 23 is a lever member that has a release lever function for a typical gear changing device. The first operating member 23 also has a state switching function for switching an operating state of the suspension fork. As shown in FIG. 3, the first operating member 23 is arranged such that it can move in a plane parallel to the second flat surface 40b of the bracket 40. The first operating member 23 is arranged on the second flat surface 40b side of the bracket 40 and supported in a freely rockable manner on the first pivot support section 46b of the pivot shaft 46. The first operating member 23 is arranged such that it can pivot freely in the clockwise direction of FIG. 4, i.e., the direction indicated with the arrow B in FIG. 4 (exemplifies a first rotational direction), and the counterclockwise direction of FIG. 4, i.e., the direction indicated with the arrow C in FIG. 4 (exemplifies a second rotational direction), from the neutral position shown in FIG. 4. The first operating member 23 is spring loaded toward the neutral position by a spring member 60 (e.g., a coil spring). The first operating member 23 has a mounting hole 23b and a sheet metal lever section 23a that extends in two substantially opposite radial directions from the mounting hole 23b. A first movement transmitting pin 25a constitutes part of the first movement transmitting mechanism 25. The first movement transmitting pin 25a is provided in an upright fashion on a first surface 23c located near the mounting hole 23b. The second movement transmitting pint 26a constitutes part of the second movement transmitting mechanism 26. The second movement transmitting pint 26a is provided in an upright fashion on a second surface 23d located on the flip side of the first operating member 23 as the first surface 23c. The first movement transmitting pin 25a is arranged to pass through a circular arc-shaped opening 40d formed in the bracket 40. The circular arc shape of the opening 40 is arranged to be coaxial with respect to the pivot axis. An operating section 23e is provided on a distal end of the first operating member 23.

The second operating member 24 is a lever member that has a cable retraction (wind-in) lever function for a typical gear changing device. The second operating member 24 is mounted on the fastening nut 41 such that it can pivot freely between an operating start position shown in FIG. 4 and an operation end position reached by pivoting counterclockwise (in FIG. 4) from the operating start position. The second operating member 24 is spring loaded toward the operation start position by a spring member 75 (e.g., a spiral spring). An operating section 24a is provided on a first end of the second operating member 24. The rocking shaft 66 that supports the winding pawl 59 is provided in an upright fashion on the operating section 24a.

The first movement transmitting mechanism 25 has the first movement transmitting pin 25a (exemplifying a first protruding part) and a first movement transmitting arm 70 (exemplifying a first movement transmitting member) arranged between the spring member 50 and the bracket 40. The first movement transmitting pint 25a is provided in an upright fashion on the first operating member 23 as mentioned previously. The first movement transmitting pint 25a is arranged and configured to pass through the opening 40d of the bracket 40 and extend to a position where it can contact the first movement transmitting arm 70.

The first movement transmitting arm 70 is configured to rock in response to a rocking movement of the first operating member 23 in the clockwise direction of FIG. 4 (first direction). The rocking movement of the movement transmitting arm 70 is transmitted to the positioning pawl 55 such that the movement of the first operating member 23 causes the first operating unit 21 to operate. The first movement transmitting arm 70 is mounted on the pivot shaft 46 with the bushing 52. The first movement transmitting arm 70 has an arm section 70a that extends radially outward from the rocking center thereof. The first movement transmitting arm 70 also has a first movement transmitting protrusion 70b (exemplifying a first engaging part) that is arranged to be spaced apart from the arm section 70a. The first movement transmitting protrusion 70b protrudes in a radial direction for engaging the first movement transmitting pin 25a. The first movement transmitting arm 70 is spring loaded in the counterclockwise direction of FIG. 3 by a spring member 69 (e.g., a coil spring). The first movement transmitting arm 70 also has a second movement transmitting protrusion 70c formed by bending a distal end of the arm section 70a toward the positioning pawl 55. As described previously, the second movement transmitting protrusion 70c contacts the actuating projection 55a of the positioning pawl 55. When the first operating member 23 rocks in the clockwise direction of FIG. 4 from the neutral position, the engagement of the first movement transmitting pin 25a with the first movement transmitting protrusion 70b causes the first movement transmitting arm to rock in the same direction. In turn, due to the clockwise pivot movement of the first movement transmitting arm 70, the second movement transmitting protrusion 70c causes the positioning pawl 55 to pivot in the clockwise direction of FIG. 4. As a result, the first cable holding member 32 starts a movement in which it releases the shift cable by an amount corresponding to one gear position.

The second movement transmitting mechanism 26 has a second movement transmitting pin 26a (exemplifying a second protruding part) and the second movement transmitting arm 71 (exemplifying a second movement transmitting member) that is formed as an integral unit with the second cable holding member 36. The second movement transmitting pin 26a is provided in an upright fashion on an end portion of the lever section 23a of the first operating member 23 that is opposite the end on which the operating section 23e is provided. The second movement transmitting pin 26a is configured to extend to a position where it can contact the second movement transmitting arm 71.

The second movement transmitting arm 71 is configured to rock in response to a rocking movement of the first operating member 23 in the counterclockwise direction of FIG. 4 (second direction). This rocking movement causes the lock member 63 to operate and actuate the second actuating unit 22. The second movement transmitting arm 71 is mounted on the first pivot support section 46a of the pivot shaft 46 and has a first arm section 71a that extends radially outward from the pivot center and a second arm section 71b that extends in a different radial direction so as to be separated from the first arm section 71a in a circumferential direction. An engaging part 71d (exemplifying a second engaging part) is provided on a distal end of the first arm section 71a such that it can contact the second movement transmitting pin 26a. An engaging pin 71c is provided in an upright fashion on a distal end of the second arm section 71b to protrude toward the lock member 63. The engaging pin 71c engages with the cam groove 63a and with an external surface in the vicinity of the distal end of the lock member 63 (indicated with bold solid line in FIG. 4). The rocking movement of the second movement transmitting arm 71 causes the engaging pin 71c to move in the first direction (clockwise direction) along the external surface and the cam groove 63a of the lock member 63, thereby causing the lock member 63 to move the second cable holding member 36 formed as an integral part of the second movement transmitting arm 71 alternately between a release position and a lock position.

The rear gear shifter device 16 has the same structure as the front gear shifter device 15 and is arranged on the inward side of the front brake lever 11 to as to be in a mirror image relationship with respect to the front gear shifter device 15.

The operation of the front gear shifter device 15 in order to shift gears and switch the operating state of the suspension fork 3 will now be explained with reference to FIG. 4.

First, an operation of pulling the front shift cable 13 will be explained.

FIG. 4 shows a state in which neither the first operating member 23 nor the second operating member 24 has been operated. The first operating member 23 is arranged in the neutral position and the second operating member 24 is arranged in the operation start position. The front derailleur 17 is in the low position, i.e., the position corresponding to the sprocket having the smallest tooth count, and the first cable holding member 32 is in the first actuation position. Similarly to FIG. 4, the subsequent FIGS. 5 to 10 show the front gear shifter device 15 as viewed from below. Different types of lines are used in these figures to make it easier to identify the parts of the device, but the line types themselves carry no particular meaning.

Figure 6:
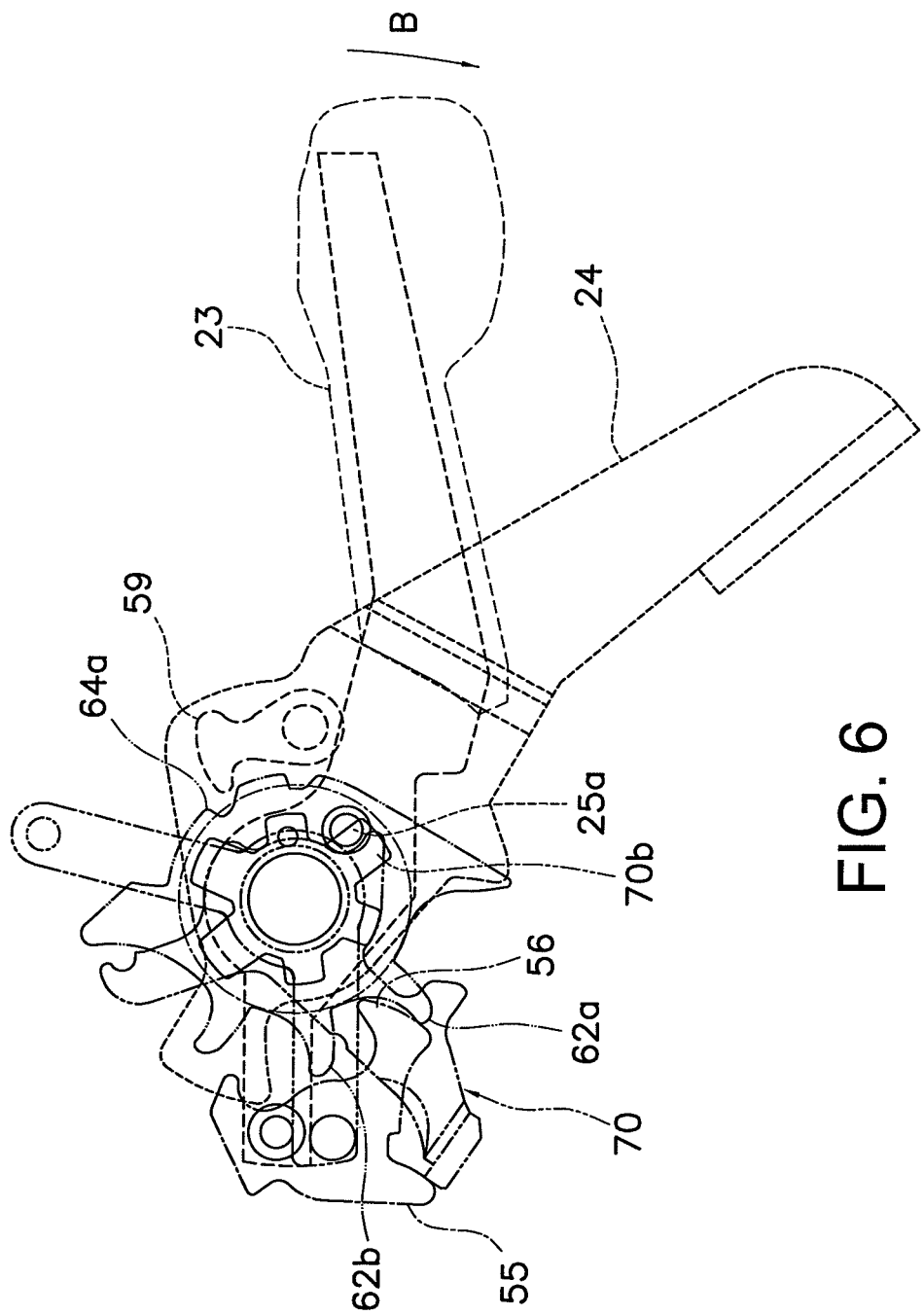
FIG. 6 is a simplified, enlarged bottom plan view, similar to FIG. 4, illustrating the second operating member at the end of an upshift operation.
Figure 7:
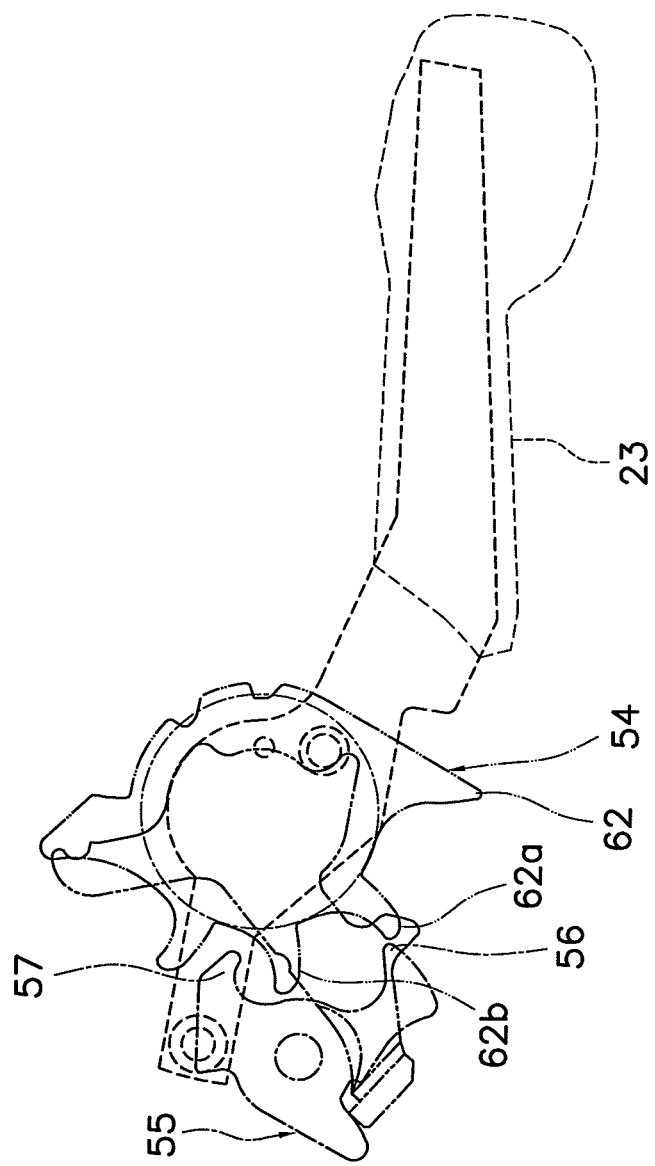
FIG. 7 is a simplified, enlarged bottom plan view, similar to FIG. 4, illustrating a first operating member being operated in a first direction in order to downshift.

If, from the state shown in FIG. 4, a rider presses the second operating member 24 with a left thumb and moves the second operating member 24 counterclockwise, i.e., in the direction indicated with the arrow A in FIG. 4, from the operation start position toward the operation end position, then the winding pawl 59 will contact the winding teeth 64 of the positioning member 54 and the positioning member 54 and first cable holding member 32 will be pivoted in the cable retracting (wind-in) direction, i.e., the counterclockwise direction of FIG. 4. This pivot movement causes the inner cable 13a to be pulled such that the front derailleur 17 moves toward an intermediate position corresponding to the middle sprocket, i.e., the sprocket having an intermediate diameter. During this movement, as shown in FIG. 5, the stop tooth 56 of the positioning pawl 55 is pressed by the positioning tooth 62a such that the positioning pawl 55 rocks in the clockwise direction. When the second operating member 24 has been pivoted to the operation end position and released, the second operating member 24 returns to the operation start position as shown in FIG. 6 due to the spring load of the spring member 75 and the positioning member 54 is positioned due to the engagement of the stop tooth 56 with the positioning teeth 62a. Meanwhile, the winding pawl 59 is arranged in a released position where it is separated from the winding teeth 64 by the contact part 61a of the holding plate 61. In this state, the first cable holding member 32 is positioned in the second actuation position.

Now an operation of releasing the front shift cable 13 will be explained.

If, from the state shown in FIG. 6, the first operating member 23 is moved clockwise, i.e., in the first direction (direction indicated with the arrow B in FIG. 6), then the first movement transmitting pin 25a presses against the first movement transmitting protrusion 70b of the first movement transmitting arm 70 and pivots the first movement transmitting arm 70 clockwise. As a result, the second movement transmitting protrusion formed on a distal end of the arm section 70a of the first movement transmitting arm 70 engages with the actuating projection 55a and moves the positioning pawl 55 in the clockwise direction. When the positioning pawl 55 pivots clockwise, the stop tooth 56 separates from the positioning tooth 62a and the positioning member 54 rotates clockwise together with the first cable holding member 32 in the cable release direction. When the positioning member 54 rotates in the cable release direction, the over rotation preventing tooth 57 of the positioning pawl 55 contacts the positioning tooth 62b located one tooth away from the positioning tooth 62a and the positioning member 54 stops rotating. When the rider releases the first operating member 23, the first operating member 23 returns to the neutral position as shown in FIG. 4 due to the spring force of the spring member 60. The positioning pawl 55 then rotates counterclockwise due to the spring member 58 and the over rotation preventing tooth 57 separates from the positioning tooth 62b, causing the positioning member 54 to rotate clockwise again. However, the stop tooth 56 contacts the positioning teeth 62 and causes the positioning member 54 and the first cable holding member 32 to be positioned (i.e., held in a position corresponding to the low gear). As a result, the inner cable 13a of the shift cable 13 is released by such an amount that the front derailleur 17 moves to the low position. Meanwhile, since the second movement transmitting arm 71 separates from the second movement transmitting pin 26a of the first operating member 23, the second movement transmitting mechanism 26 does not move.

Now, an operation in which the state switching cable 10 is pulled in the lock direction and an operation in which the state switching cable 10 is loosened in the lock release direction.

Figure 8:
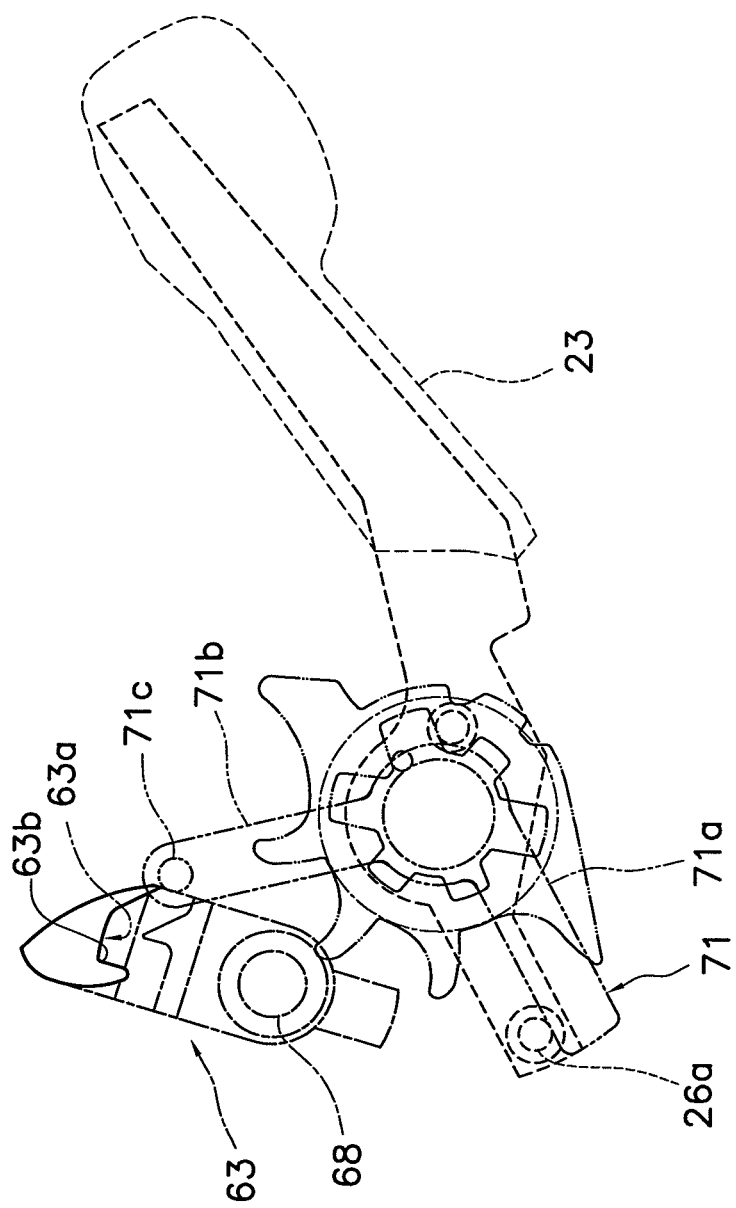
FIG. 8 is a simplified, enlarged bottom plan view, similar to FIG. 4, illustrating the first operating member being operated in a second direction to switch a suspension operating state.
Figure 9:
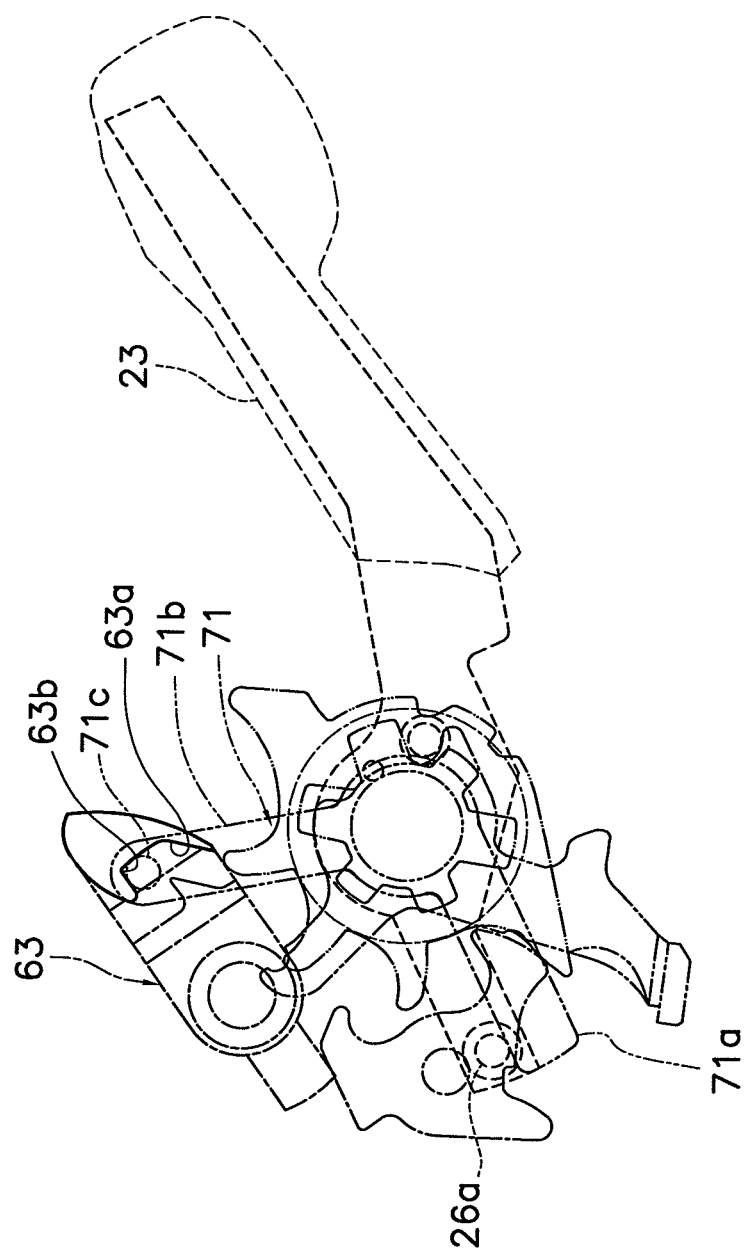
FIG. 9 is a simplified, enlarged bottom plan view, similar to FIG. 4, illustrating a locked state obtained by performing a suspension operating state switching operation.

When the second cable holding member 36 is in the release position, i.e., the state shown in FIG. 4, and the first operating member 23 is operated in the second direction, i.e., the counterclockwise direction of FIG. 4 (direction indicated with an arrow C in FIG. 4), the second movement transmitting pin 26a provided on the first operating member 23 is pressed against the second arm section 71a of the second movement transmitting arm 71 and the second transmitting arm 71 is pivoted counterclockwise, as shown in FIG. 8. The engaging pin 71c moves along an external surface of the lock member 63 and causes the lock member 63 to pivot counterclockwise. At an intermediate point during this movement, the engaging pin 71c reaches an end portion of the cam groove 63a and engages with the cam groove 63a so as to enter the cam groove 63a. The cam groove 63a has a stopping portion 63b where it bends approximately 90 degrees such that the engaging pin 71c can be stopped. When the engaging pin 71c enters the cam groove 63a, the lock member 63 pivots clockwise due to the spring force of the spring member 72 until, as shown in FIG. 9, the engaging pin 71c is stopped by the stopping portion 63b such that the lock member 63 becomes held in the second holding position. The second movement transmitting arm 71 is thus positioned by the lock member 63. As a result, the second cable holding member 36 is positioned in the lock position. When the second cable holding member 36 is positioned in the lock position, the state switching cable 10 causes the suspension fork 3 to be in a locked state in which it does not produce a suspension effect. If the rider releases the first operating member 23 while the lock member 63 is positioned in the second holding position, then the first operating member 23 will return to the neutral position due to the spring force of the spring member 60. This situation is illustrated in FIG. 10. In the state shown in FIG. 10, the second movement transmitting pin 26a is separated from the first arm section 71a of the second movement transmitting arm 71.

Now assume that the first operating member 23 is pivoted again counterclockwise from the neutral position while the lock member 63 is positioned in the second holding position as shown in FIG. 10. After the second movement transmitting pin 26a contacts the first arm section 71a, the second movement transmitting arm 71 pivots further counterclockwise from the locked state and the engaging pint 71c comes out of the cam groove 63a. As a result, the lock member 63 returns to the first holding position due to the spring loading of the spring member 72 and the engaging pin 71c moves clockwise along the external surface of the distal end of the lock member 63 so as to return to the state shown in FIG. 4. As a result, the suspension fork 3 is returned to a released state in which the suspension function is produced.

The operation is simple because the suspension fork 3 can be switched alternately between a locked state and a released state by operating the first operating member 23 in the same manner, i.e., by pivoting the first operating member 23 in the second direction.

Also, since two component parts, i.e., the front derailleur 17 and the suspension fork 3, can be operated by changing the direction in which the first operating member 23 is moved, two component parts 17 and 3 can be operated easily with a single first operating member 23. As a result, two component parts that require positioning, e.g., a gear changing device (e.g., derailleur 17 or 18) and a suspension device, can be operated by operating a single first operating member 23 in different directions and the two component parts 17 and 3 can be operated easily without releasing one's hand from the first operating member 23.

Since the first and second movement transmitting mechanisms 25 and 26 are arranged between the first operating member 23 and the first and second actuating units 21 and 22, two component parts 17 and 3 can be actuated by moving the first operating member 23 in different directions. Here, "between" does not mean spatially between but, rather, it means "between" in the sense of an intermediate position along a power transmission path. In other words, the first and second movement transmission mechanisms 25 and 26 each exists along the power transmission path through which force is transmitted from the first operating member 23 to the first and second actuating units 21 and 22.

Since the first operating member 23 is arranged sandwiched between the first and second movement transmitting mechanisms 25 and 26, movements of the first operating member 23 in the first and second directions can easily be transmitted to the first and second actuating units 21 and 22.

Although in the previously described embodiment the first and second movement directions of the first operating member are opposite directions within the same plane, the present invention is not limited to such an arrangement. For example, it is acceptable to contrive the first operating member 23 such that it can be moved about two intersecting axes such that the first direction and the second direction intersect each other.

Although in the previously described embodiment a front derailleur 17 is presented as an example of a first component part and a suspension fork 3 is presented as an example of a second component, the first and second component parts can be any type of component part that can be operated on a bicycle. For example, the first component part can be a front derailleur and the second component part a rear derailleur such that both derailleurs are operated with the first operating member. Or, the first component part can be a brake device and the second component part a suspension fork such that a brake device and a suspension fork are controlled with the first operating member.

Although in the previously described embodiment the bicycle control device is for operating an external gear changing device having a front derailleur and a rear derailleur, the present invention can also be applied to a bicycle control device for an internal gear changing device having an internally geared hub.

Although in the previously described embodiment the mounting part 20 of the front gear shifter device 15 and the rear brake lever 11 are separate entities, it is acceptable for the mounting part to be fixed integrally to a brake lever bracket.

Although in the previously described embodiment the invention is explained using a front gear shifter device 15 of a front derailleur 17 as an example, the invention can also be employed to switch the operating state of a rear suspension in a bicycle equipped with a rear suspension for a rear wheel. For example, a first operating member of a rear gear shifter device 16 can be configured to operate in a first direction and a second direction so as to actuate both a rear derailleur and a rear suspension (i.e., two component parts).

Although in the previously described embodiment the present invention is explained using bicycle components that are operated using a cable, the present invention is not limited to such components. For example, the invention can also be applied to an electric powered gear changing device and an electric powered suspension device configured to be operated using an electric switch.

Figure 11:
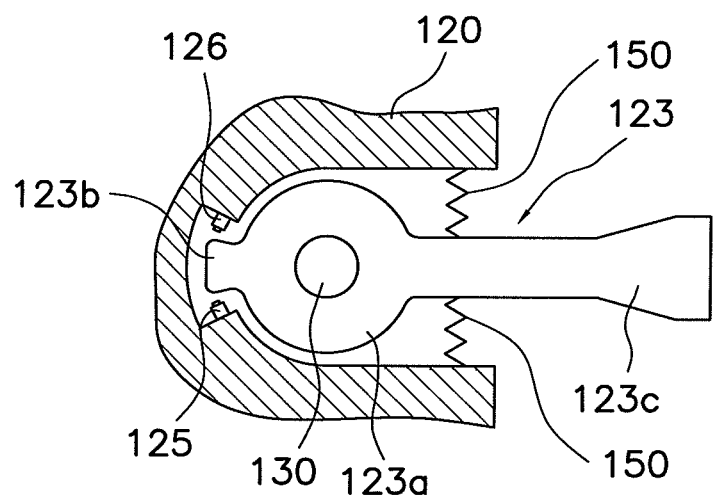
FIGS. 11-12 are simplified schematic views of a bicycle control device in accordance with another embodiment.
Figure 12:
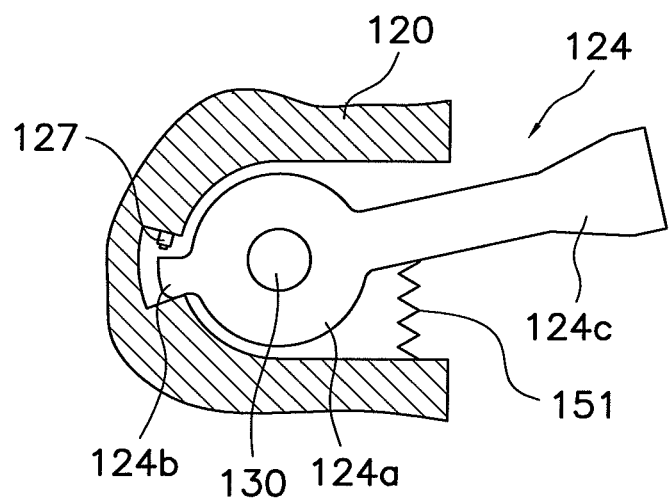

FIG. 11 shows a first operating member 123 for shifting gears. The first operating member 123 has a pivot support section 123a that is pivotally mounted to a pivot shaft 130 mounted to a mounting part 120 configured to be mounted to a bicycle, a switch actuating section 123b that extends toward a first end from the pivot support section 123a, and an operating section 123c that extends toward a second end from the pivot support section 123a. The first operating member 123 is spring loaded toward a neutral position by a pair of spring members 150. Electric switches 125 and 126 (e.g., tact switches) are provided in the mounting part 120 on both sides of the switch actuating section 123b. The electric switch 125 is for shifting the gear changing device in one direction (e.g., upshifting), and the electric switch 126 is for switching the operating state of a suspension device.

A second operating member 124 is pivotally mounted on the pivot shaft 130 and arranged to be separated from the first operating member 123 along the axial direction of the pivot shaft 130. The second operating member 124 has a pivot support section 124a that is pivotally mounted to a pivot shaft 130, a switch actuating section 124b that extends toward a first end from the pivot support section 124a, and an operating section 124c that extends toward a second end from the pivot support section 124a. The second operating member 124 is spring loaded in the counterclockwise direction of FIG. 11 by a spring member 151. An electric switch 127 (e.g., a tact switch) is provided in the mounting part 120 on one side of the switch actuating section 124b. The electric switch 127 is a switch for shifting the gear changing device in the other direction (e.g., downshifting).

In this kind of configuration, too, the present invention can achieve similar effects to those described above.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with a bicycle control device of the present invention. Accordingly, these terms, as utilized to describe the present invention should be interpreted relative to a bicycle equipped with a bicycle control device of the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle control device for operating a first component part and a second component part of a bicycle, the bicycle control device comprising:
    a mounting part configured to be mounted to the bicycle;
    a first actuating unit including a first actuating member configured to be connected to the first component part and a first positioning mechanism operatively coupled to the first actuating member to selectively maintain the first actuating member in at least two stationary first actuating positions in which the first actuating member remains stationary relative to the mounting part;
    a second actuating unit including a second actuating member configured to be connected to the second component part and configured to be operated between at least two; and
    a first operating member movably coupled to the mounting part and operatively coupled to the first and second actuating units to operate the first actuating member between the at least two stationary first actuating positions as the first operating member is moved in a first direction from a neutral position to a first operated position and to operate the second actuating member between the at least two positions as the first operating member is moved from the neutral position to a second operated position in a second direction that is different from the first direction,
    the first operating member being configured to return to the neutral position after each operation of the first actuating member to change the actuating position of the first actuating member such that, the first positioning mechanism maintains the first actuating member in one of the at least two stationary first actuating positions, and the first operating member being configured to return to the neutral position after each operation of the second actuating member to change the actuating position of the second actuating member such that the second positioning mechanism maintains the second actuating member in one of the at least two positions,
    the first and second actuating members being independently moved by the first operating member, the first actuating member remaining stationary as the second actuating member is moved by the first operating member, and the second actuating member remaining stationary as the first actuating member is moved by the first operating member.

2. The bicycle control device as recited in claim 1, wherein
    the first and second directions are opposite rotational directions with respect to a single pivot axis.

3. The bicycle control device as recited in claim 1, further comprising
    a second operating member movably coupled to the mounting part from a start position to an end position, the second operating member being operatively coupled to the first actuating unit to move the first actuating member to a first of the at least two stationary first actuation positions from a second of the at least two stationary first actuation positions, the second of the at least two positions being different from the first of the at least two positions.

4. The bicycle control device as recited in claim 3, wherein
    the second actuating unit is configured to move alternately between a third of the at least two positions and a fourth of the at least two positions upon movement of the first operating member in the second direction.

5. The bicycle control device as recited in claim 1, wherein
    the mounting part includes a housing having the first and second actuating units disposed within the housing.

6. The bicycle control device as recited in claim 1, wherein
    the first operating member is arranged between the first actuating unit and the second actuating unit.

7. The bicycle control device as recited in claim 1, further comprising
    a first movement transmitting mechanism arranged between the first operating member and the first actuating unit to transmit a movement of the first operating member in the first direction to the first actuating unit; and
    a second movement transmitting mechanism arranged between the first operating member and the second actuating unit to transmit a movement of the first operating member in the second direction that is different from the first direction to the second actuating unit.

8. The bicycle control device as recited in claim 7, wherein
    the first movement transmitting mechanism has a first movement transmitting member movably mounted with respect to the mounting part, and a first protruding part provided on a portion of the first operating member, the first protruding part engaging the first movement transmitting member by movement of the first operating member in the first direction to operate the first actuating unit; and
    the second movement transmitting mechanism has a second movement transmitting member movably mounted with respect to the mounting part, and a second protruding part provided on a portion of the first operating member, the second protruding part engaging the second movement transmitting member by movement of the first operating member in the second direction to operate the second actuating unit.

* * * * *